United States Patent [19]

Clason

[11] 4,211,314
[45] Jul. 8, 1980

[54] INTERLOCK MECHANISM

[75] Inventor: Frank L. Clason, Newbury, Ohio

[73] Assignee: Towmotor Corporation, Mentor, Ohio

[21] Appl. No.: 5,637

[22] Filed: Dec. 14, 1978

[51] Int. Cl.² .................. B60K 41/26; F16D 67/00
[52] U.S. Cl. .................................. 192/4 A; 74/483 R
[58] Field of Search ................... 192/4 A, 4 R, 13 R, 192/3 T; 74/477, 483 R, 878

[56] References Cited

U.S. PATENT DOCUMENTS

| | | | |
|---|---|---|---|
| 2,652,910 | 9/1953 | Godeck | 192/4 R |
| 2,787,355 | 4/1957 | Dodge | 192/18 R |
| 2,856,043 | 10/1958 | Nelson | 192/3 T |
| 2,908,188 | 10/1959 | Maybarduk | 192/18 R |
| 3,580,370 | 5/1971 | McCammon | 74/483 R |

*Primary Examiner*—George H. Krizmanich
*Attorney, Agent, or Firm*—William B. Heming

[57] ABSTRACT

A rotating assembly (10) is associated with transmission and parking brake components (33,34) of a work vehicle or arbor and chuck components of a machine tool operation. The use of one component during operation of the other component can result in damage to the components. The rotating assembly (10) has a first member (12) and a second annular member (14). Rotation of each member (12,14) is associated with operation of a respective component, such as shifting the transmission (33) or applying or releasing the brake (34). Apparatus (38) maintains one of the first member (12) and second annular member (14) against rotation and frees the other of the members (14,12) for rotation at respective positions (40,42) of the apparatus (38) for selectivey interlocking the first member (12) relative to the second member (14). This prevents application of the brake (34) if the transmission (33) is not in neutral and prevents shifting of the transmission (33) from neutral before the brake (34) is released.

14 Claims, 9 Drawing Figures

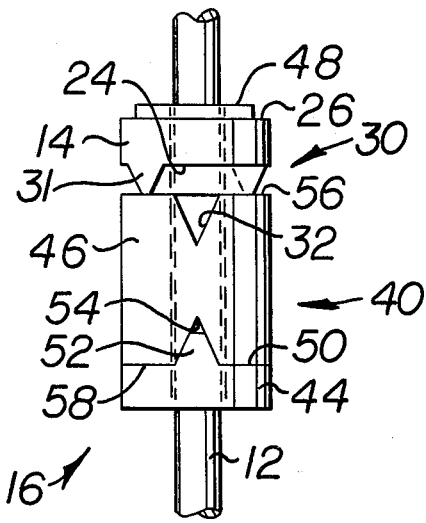
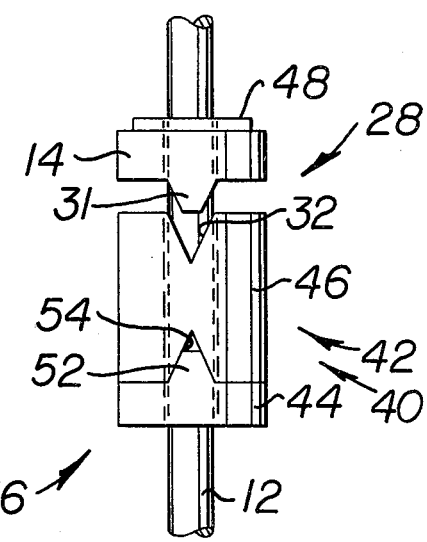
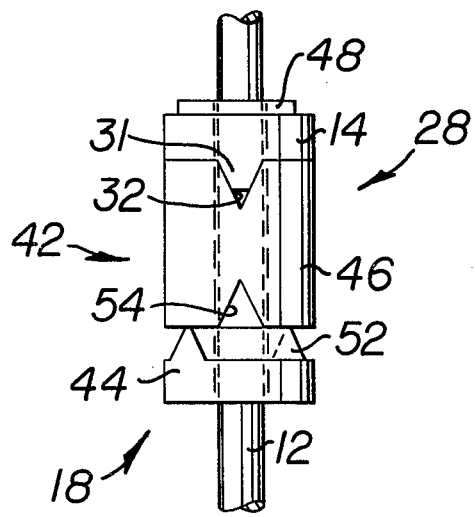
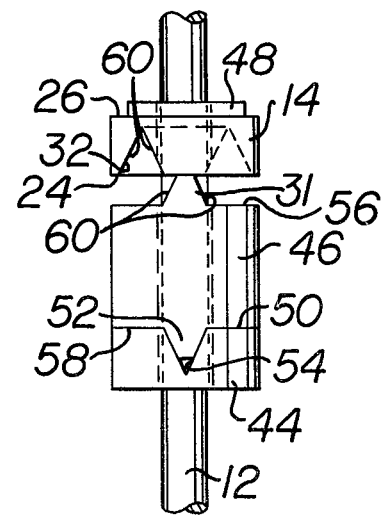

INTERLOCK MECHANISM

TECHNICAL FIELD

The invention relates to means for maintaining one of a first member and second annular member against rotation and freeing the other of said members for rotation at selected positions of the means. More particularly, the invention relates to interlocking the first member relative to the second annular memfor example, shifting of a transmission when a parking brake is applied or loosening of a machine tool chuck if the arbor is rotating.

BACKGROUND ART

In the use of a rotating assembly, it is desirable to selectively interlock a first member relative to a second annular member for selectively preventing the operation of a function associated with one of the members and permitting operation of a different function associated with the other of the members.

The invention relates to means for maintaining one of the first member and second annular member against rotation and freeing the other of said members for rotation at selected positions of the means for interlocking the first member relative to the second annular member.

U.S. Pat. No. 2,856,043, Oct. 14, 1958, issued to Nelson, discloses a mechanism for maintaining an annular member against rotation relative to a shaft and for freeing the annular member for rotation by rotating the shaft.

In a work vehicle, for example, the first member of the rotating assembly is commonly a shaft associated with control of the transmission system, such as in the selection of forward, neutral, or reverse. The second annular member is associated with use of a parking brake system. It is generally undesirable to shift the transmission to forward or reverse and move the vehicle if the parking brake is applied or to apply the brake if the vehicle is moving. However, the operator of the vehicle can sometimes inadvertently shift the transmission to move the vehicle if the brake is applied. The operator can also sometimes apply the brake during movement of the vehicle. This can result in damage to vehicle components and represents a waste of time and labor if he is not aware and operating this way.

Therefore, it is desirable to provide means for interlocking the first member relative to the second annular member in order to prevent operation of one of the systems if the other of the systems is in use.

DISCLOSURE OF THE INVENTION

In one aspect of the invention, a rotating assembly has a first member rotatable between first and second positions and a second annular member positioned about said first member. The second annular member is rotatable relative to the first member between first and second positions. Means is provided for maintaining the first member against rotation and freeing the second annular member for rotation at a first position of said means and for maintaining the second annular member against rotation and freeing the first member for rotation at a second position of said means.

A transmission of a work vehicle, for example, can sometimes be shifted and the vehicle moved although the parking brake is applied. The parking brake can sometimes be applied during movement of the vehicle. The invention provides means for selectively interlocking the first member relative to the second annular member. Shifting of the transmission, associated with rotation of the first member, is prevented if the first member is maintained against rotation. Application of the brake, associated with rotation of the second annular member, is prevented if the second annular member is maintained against rotation. This substantially overcomes the use of one of the transmission and parking brake during operation of the other of the transmission and parking brake for avoiding possible damage resulting from concurrent use of the systems.

BRIEF DESCRIPTION OF THE DRAWINGS

FIG. 6 is a diagrammatic view showing another embodiment of the invention;

FIG. 7 is a diagrammatic view showing the embodiment of FIG. 6 in greater detail;

FIG. 8 is a diagrammatic view showing the embodiment of FIG. 6 in still greater detail; and FIG. 9 is a diagrammatic view showing yet another embodiment of the invention.

BEST MODE FOR CARRYING OUT THE INVENTION

Figure 1:
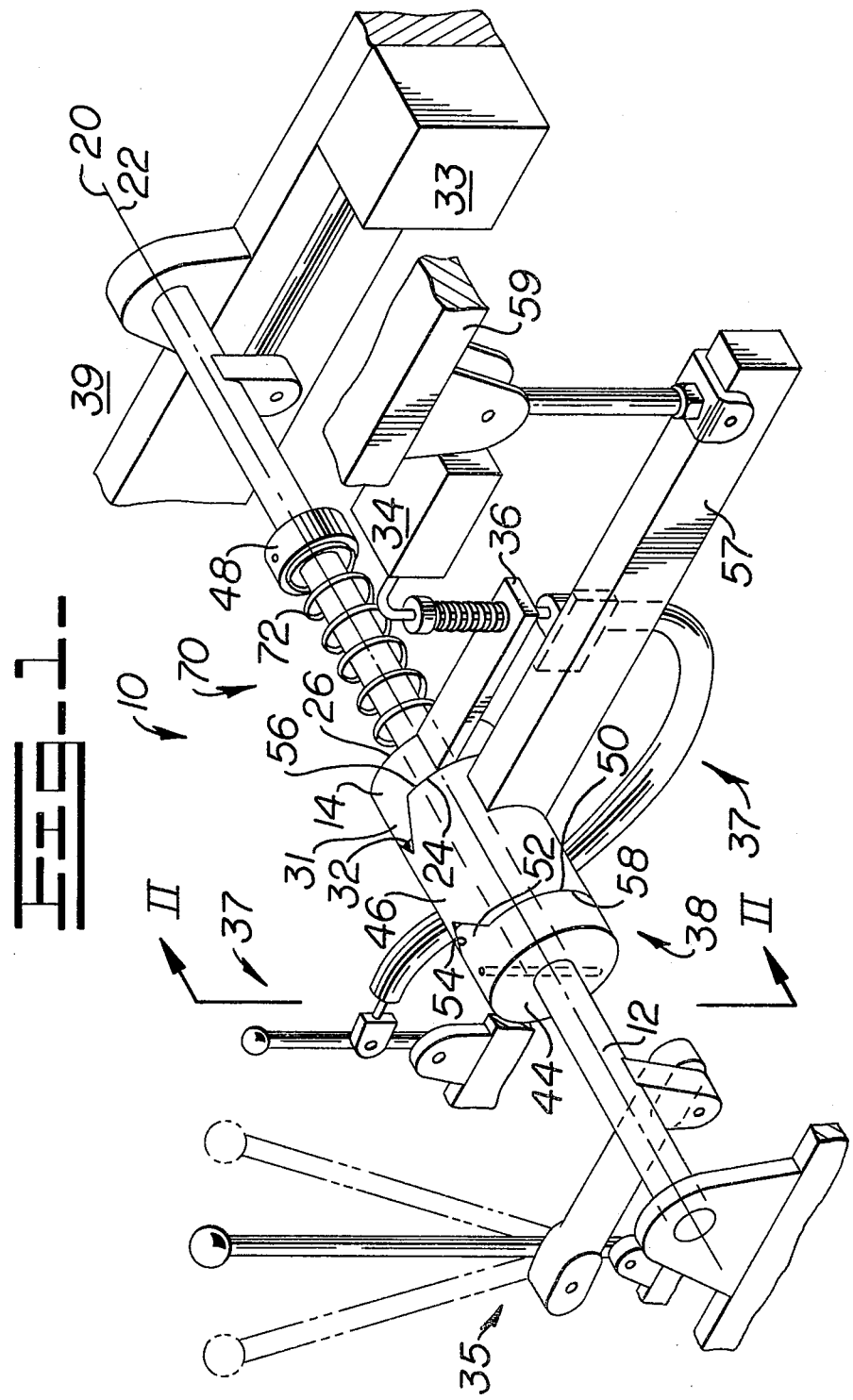
FIG. 1 is a diagrammatic isometric view of an embodiment of the invention associated with a transmission and brake.

Referring to the drawings, a rotating assembly 10 has a first member 12 and a second annular member 14. The first member 12 is rotatable between first and second positions 16,18, as shown, for example, in FIGS. 3 and 4, respectively. Said member 12 has an axis of rotation 20 and is preferably a shaft 12. The second annular member 14 has an axis of rotation 22 and first and second ends 24,26. The first member axis of rotation 20 is shown as substantially the same as the second annular member axis of rotation 22. Said second annular member 14 is positioned about the first member 12 and rotatable between first and second positions 28 (FIG. 4), 30 (FIG. 3) relative to said first member 12. Said second annular member first end 24 has one of a protrusion 31 and opening 32 as shown, for example, in FIGS. 1 and 9. Preferably, said first end 24 has the protrusion 31.

Figure 2:
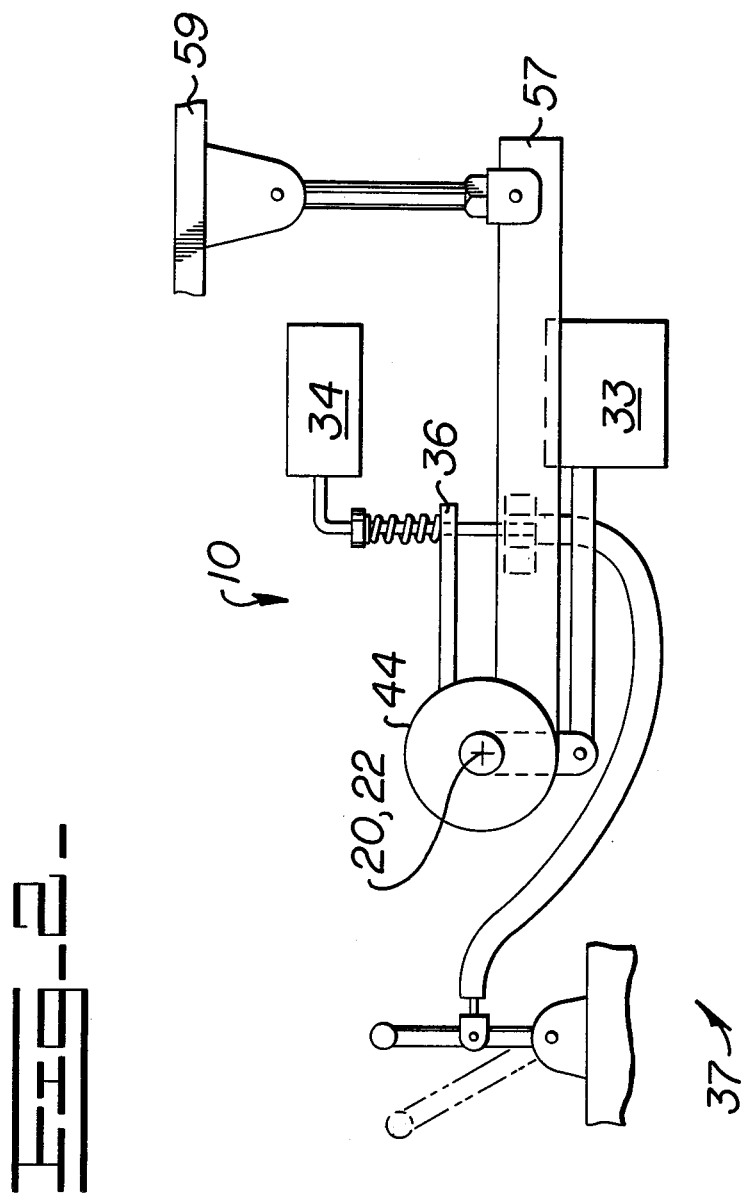
FIG. 2 is a diagrammatic view taken along line II—II of FIG. 1 showing the invention in greater detail.

Referring to FIGS. 1 and 2, the rotating assembly 10 is associated with, for example, the transmission 33 and parking brake 34 of a work vehicle 39. A transmission control element 35 is connected to the first member 12. The second annular member 14 preferably has a flange 36. A brake control element 37 is connected to the flange 36.

Figure 3:
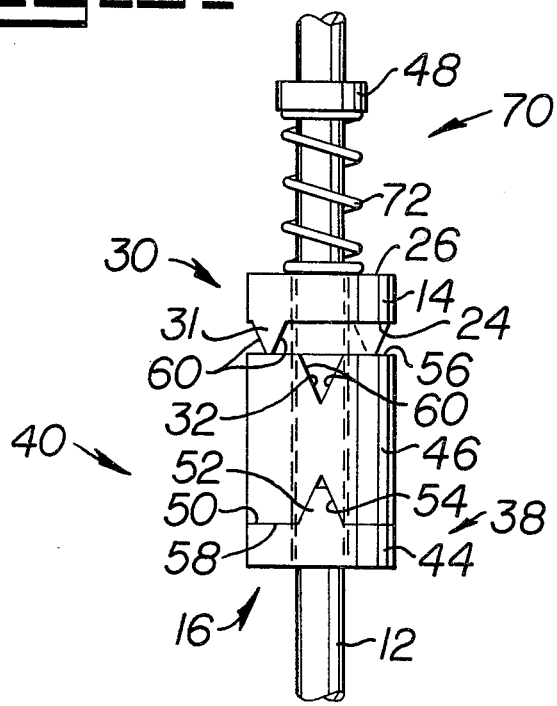
FIG. 3 is a diagrammatic view showing the embodiment of FIG. 1 in greater detail.
Figure 4:
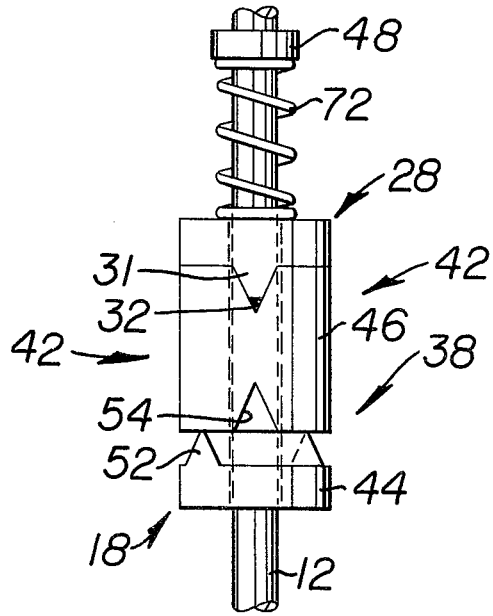
FIG. 4 is a diagrammatic view showing the embodiment of FIG. 1 in still greater detail.

First means 38 is provided for maintaining the first member 12 against rotation and freeing the second annular member 14 for rotation at a first position 40 of said means 38 (FIGS. 3,6). The first means 38 is further provided for maintaining the second annular member 14 against rotation and freeing the first member 12 for rotation at a second position 42 of said first means 38 (FIGS. 4 and 8). Thus, said means 38 selectively interlocks the first member 12 relative to the second annular member 14. In other words, blocking the first member 12 from rotation frees the second annular member 14 for rotation and vice versa.

The first means 38 includes a third member 44, fourth annular member 46, and fifth member 48. The third member 44 has a first end 50 and is connected to the first member 12. Said first end 50 has one of a protrusion 52 and opening 54 (FIGS. 1 and 9). Preferably, said first end 50 has the protrusion 52.

The fourth annular member 46 has first and second ends 56,58. Said member 46 is positioned about the first member 12 and between the second annular member 14 and third member 44. The first end 56 has the other of said protrusion 31 and opening 32 relative to the first end 24 of the second annular member 14. The second end 58 has the other of said protrusion 52 and opening 54 relative to the first end 50 of the third member 44. Said protrusions 31,52 are shown truncated to provide sufficient bearing area for preventing damage to the rotating assembly 10 under forces of operation.

The fourth annular member 46 and first member 12 are movable relative one to the other along the axis 20 of the first member 12. As is shown, an arm 57 connects the fourth annular member 46 to a frame 59. The fourth annular member 46 is movable along the first member axis 20. The first member 12 can also be movable along the axis 20 with the fourth annular member 46 in supporting relationship with said first member 12.

The fifth member 48 is connected to the first member 12 and positioned adjacent the second annular member 14. The fifth member 48 is preferably in slidable contactable relationship with the second annular member second end 26 in the embodiment of FIGS. 6 through 9.

The respective protrusions and openings 31,32, 52,54 are mateable at selected positions of the first means 38. The protrusion 52 and opening 54 of the third member first end 50 and fourth annular member second end 58 are mateable at the first position 40 of the first means 38 (FIGS. 3, 6 and 7). The protrusion 31 and opening 32 of the second annular member first end 24 and fourth annular member first end 56 are mateable at the second position 52 of the first means 38 (FIGS. 4, 5, 7 and 8). The respective members 14,16;44,46 having the mateable protrusions and openings 31,32;52,54 are maintained against relative rotation in response to mating of the respective protrusions 31,52 and openings 32,54.

The mateable protrusions and openings 31,32, 52,54 preferably each have angular side walls 60 relative to the first member axis 20 (FIG. 3 and 9). It is desirable that respective protrusions 31,52 and openings 32,54 move relative one to the other between the first and second positions 28,30,16,18 of the first member 12 and second annular member 14, respectively. At the respective first positions 28,16, the respective protrusions 31,52 are mateable with respective openings 32,54. At the respective second positions 18,30, the respective protrusions 31,52 are blocked from mating with respective openings 32,54. The protrusion 31 and opening 32 of the second annular member first end 24 and fourth annular member first end 56 are movable one relative to the other in response to rotation of the second annular member 14. The protrusion 52 and opening 54 of the third member 44 and fourth annular member 46 are movable relative one to the other in response to rotation of the first member 12. Therefore, rotation of the first member 12, for example, will exert a force on the related protrusion 52 tending to move said protrusion 52 relative to and from the mating opening 54.

Preferably, the protrusions 31,52 are in slidable contact at their respective second positions 30,18 with the respective ends 56,58 of the fourth annular member 46 having the respective mateable openings 32,54.

Said protrusions 31,52 also preferably extend an equal distance from the respective ends 24,50 of the members 14,44. In this manner, along with the preferred position of the fifth member 48 in slidable contact with the second annular member second end 26, the distance between the third and fifth members 44,48 in FIGS. 6 through 8 is substantially equal to the length of the fourth annular member 46 plus the distance one of the protrusions 31,52 extends from the related one of the members 14,44.

The respective protrusions 31,52 and openings 32,54 extend across the related ends 24,50;56,58 of the members 14,44,46 having the protrusions 31,52 and openings 32,54. It should be understood that the protrusions 31,52 and openings 32,54 can be of other configurations without departing from the invention. For example, the openings 32,54 can be rotated one relative to the other instead of extending in the same axial plane as shown or more than one mateable protrusion can be provided on the related ends 24,56;50,58.

As is shown in FIGS. 1 through 5, the first means 38 preferably includes second means 70. The second means 70 is provided for selectively freeing the second annular member 14 for rotation at the second position 42 of the first means 38 in response to a preselected rotating force on the second annular member 14. In other words, an override is provided in the rotating assembly 10. Said second means 70 includes a spring 72. The spring 72 has a preselected spring constant and is positioned between the second annular member 14 and fifth member 48. The second means 70 can also include 1 or more cone shaped steel disc washers, commonly known as Belleville springs. Further, the second annular member 14 is movable relative to the first member 12 along the axis 20 of the first member 12.

INDUSTRIAL APPLICABILITY

In the operation of the rotating assembly 10, the first member 12 and second annular member 14 are rotated to respective first and second positions 16,18;28, 30 such that only one of the related protrusions 52,31 is mated with the respective one of the openings 54,30 at any one time. One of said members 12,14 is maintained against rotation and the other 14,12 is freed for rotation by mating of the related protrusions 52,31 and openings 54,32 for selectively interlocking the first member 12 relative to the second annular member 14.

For example, rotation of the first member 12 is associated with a force exerted on the transmission control element 35 for shifting the transmission 33 to forward, neutral, or reverse. Rotation of the second annular member 14 is associated with a force exerted on the brake control element 37 to apply or release the brake 34. Therefore, if one of said members 12,14 is maintained against rotation, the respective transmission 33 or brake 34 is in an inoperable condition.

At the first position 40 of the first means 38, the transmission 33 is shifted to neutral and the parking brake 34 is applied (FIGS. 3 and 6). The second annular member 14 is at the second position 30 and free for rotation. The first member 12 is at the first position 16 and maintained against rotation owing to the third member protrusion 52 mating with the respective opening 54 and resistance of the fourth annular member 46 to rotation.

The second annular member 14 is rotated to the first position 28, as is shown, for example, in FIG. 7, to release the parking brake 34. The first member 12 is free for rotation in both clockwise and counterclockwise directions and the transmission 33 can be shifted. The direction of rotation accommodates the forward and reverse modes of the transmission 33.

Shifting of the transmission 33 rotates the first member 12. The protrusion 52 moves relative to the opening 54 toward the first member second position 18. The fourth annular member 46 is thereby forced to move axially relative to the first member 12 and toward the second annular member 14. As a result, the second annular member protrusion 31 mates with the respective opening 32 (FIGS. 4 and 8). The second annular member 14 is maintained against rotation for resisting application of the brake 34. Similarly, the second annular member 14 can be freed for rotation and the first annular member 12 maintained against rotation.

Referring to FIGS. 6 through 8, the first member 12 is interlocked relative to the second annular member 14 owing to the spacing between the third and fifth members 44,48. The spacing between said third and fifth members 44,48 is such that one of the protrusions 31,52 is always mated with the respective one of the openings 32,54. The other one of the protrusions 52,31 is adjacent and preferably slides in relative contact with the one of the fourth annular member ends 58,56 to maintain against rotation one of the respective members 14,44 having the mated one of the protrusions 31,52.

Figure 5:
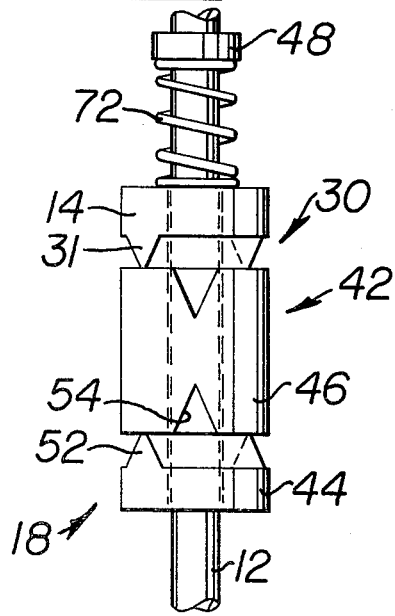
FIG. 5 is a diagrammatic view showing the embodiment of FIG. 1 in still greater detail.

Referring to the embodiment of FIG. 1, the spring 72 has a preselected spring force determined by the expected magnitude of the preselected rotating force to be exerted on the second annular member 14. Normally, the second annular member 14 is maintained against rotation at the first means second position 42 (FIG. 4). In order to apply the brake 34, the operator of the vehicle exerts sufficient force on the control element 37 to apply the preselected rotating force on the second annular member 14. The second annular member 14 overcomes the spring 72 and moves toward the second position 30 owing to the relative movement of the respective protrusion 31 and opening 32 from the first position 28 of the second annular member 14 toward the second position 30 (FIG. 5). The resultant rotation of the second annular member 14 corresponds with application of the brake 34.

It is desirable that the spring 72 be fully extended at the first and second positions 40,42 of the first means 38, as is shown in FIGS. 3 and 4. No additional force is therefore required to overcome the spring 72 in moving the transmission control element 35 or brake control element or cable 37 for freeing only one of the first member 12 and second annular member 14 for rotation and maintaining the other of said members 14,12 against rotation.

In the above described manner, the rotation of the first member 12 and second annular member 14 is selectively controlled in order to interlock operation of the transmission 33 and parking brake 34. This substantially overcomes inadvertent operation of one of said components 33,34 during operation of the other of said components 34,33 for preventing damage to the components 33,34 or the associated work vehicle 39. The rotating assembly 10 is also adaptable for multiple interlock functions by the addition of additional annular members about the first member 12. Such additional members can provide independent or dependent interlocking functions for additional control elements.

Other aspects, objects and advantages of this invention can be obtained from a study of the drawings, the disclosure and the appended claims.

I claim:

1. In a rotating assembly (10) having a first member (12) having an axis of rotation (20) and being rotatable between first and second positions (16,18), a second annular member (14) having an axis of rotation (22) and first and second ends (24,26) and being positioned about the first member (12), said second annular member (14) being rotatable between first and second positions (28,30) relative to the first member (12), the improvement comprising:

first means (38) for maintaining the first member (12) against rotation and freeing the second annular member (14) for rotation at a first position (40) of said first means (38) and freeing the first member (12) for rotation and maintaining the second annular member (14) against rotation at a second position (42) of said first means (38) for selectively interlocking the first member (12) relative to the second annular member (14).

2. The improvement, as set forth in claim 1, wherein the first member (12) is connected to a transmission (33) and the second member (14) is connected to a brake (34).

3. The improvement, as set forth in claim 1, wherein the first end (24) of the second annular member (14) has one of a protrusion (31) and opening (32) and wherein the first means (38) includes:

a third member (44) having a first end (50) and being connected to the first member (12), said first end (50) having one of a protrusion (52) and opening (54);

a fourth annular member (46) having first and second ends (56,58) and being positioned about the first member (12) and between the second annular member (14) and third member (44), said fourth annular member (46) and first member (12) being movable one relative to the other along the axis (20) of the first member (12), said first end (56) having the other of said protrusion (31) and opening (32) relative to said second annular member first end (24), said second end (58) having the other of said protrusion (52) and opening (54) relative to said third member (44), said respective protrusions (31,52) and openings (32,54) being mateable at selected positions (40,42) of said first means (38), said respective members (14,44,46) having the mateable protrusions (31,52) and openings (32,54) being maintained against relative rotation in response to mating of the respective protrusions (31,52) and openings (32,54); and a fifth member (48) being connected to the first member (12) and positioned adjacent the second annular member (14).

4. The improvement, as set forth in claim 3, wherein the fourth annular member (46) is movable along the axis (20) of the first member (12).

5. The improvement, as set forth in claim 3, wherein the first member (12) is movable along the axis (20) of said first member (12) and the fourth annular member (46) is in supporting relationship with said first member (12).

6. The improvement, as set forth in claim 3, wherein the fifth member (48) is in slidable contactable relationship with the second end (26) of the second annual member (14).

7. The improvement, as set forth in claim 3, wherein said first means (38) includes second means (70) for selectively freeing said second annular member (14) for rotation at the second position (42) of the first means (38) and in response to a preselected rotating force on said second annular member (14).

8. The improvement, as set forth in claim 7, wherein the second annular member (14) is movable relative to the first member (12) along the axis (20) of the first member (12), and wherein the second means (70) includes a spring (72) having a preselected spring constant and being positioned between the second annular member (14) and the fifth member (48).

9. The improvement, as set forth in claim 3, wherein said mateable protrusions (31,52) and openings (32,54) each have angular side walls (60) relative to the first member axis (20).

10. The improvement, as set forth in claim 3, wherein the mateable protrusion (31) and opening (32) of the second annular member first end (24) and the fourth annular member first end (56) move relative one to the other between the first position (28) of the second annular member (14) at which said protrusion (31) is mateable with said opening (32) and the second position (30) at which said protrusion (31) is blocked from mating with said opening (32), said protrusion (31) and opening (32) being moved relative one to the other in response to rotation of the second annular member (14).

11. The improvement, as set forth in claim 3, wherein the mateable protrusion (52) and opening (54) of the third member first end (50) and fourth annular member second end (58) move relative one to the other between the first member first position (16) at which said protrusion (52) is mateable with said opening (54) and the second position (18) at which said protrusion (52) is blocked from mating with said opening (54), said protrusion (52) and opening (54) being moved relative one to the other in response to rotation of the first member (12).

12. The improvement, as set forth in claim 10, wherein the protrusion (31) is in slidable contact at said second position (30) with the one of the ends (24,56) of the second and fourth annular members (14,46) having the respective mateable opening (32).

13. The improvement, as set forth in claim 11, wherein the protrusion (52) is in slidable contact at said second position (18) with the one of the ends (50,58) of the third member (44) and fourth annular member (46) having the respective mateable opening (54).

14. An interlocking mechanism for a transmission and parking brake (33,34) of a work vehicle, comprising:
a transmission control element (35);
a brake control element (37);
a rotating assembly (10) having a first member (12) having an axis of rotation (20) and a second annular member (14) having an axis of rotation (22), said first member (12) being connected to said transmission control element (35) and rotatable between first and second positions (16,18), said second annular member (14) being connected to the brake control element (37) and rotatable between first and second positions (28,30) relative to the first member (12); and
first means (38) for maintaining the first member (12) against rotation and freeing the second annular member (14) for rotation at a first position (40) of said first means (38) and for freeing the first member (12) for rotation and maintaining the second annular member (14) against rotation at a second position (42) of said first means (38) for selectively interlocking the first member (12) relative to the second annular member (14).

* * * * *